United States Patent
Yamanishi et al.

(10) Patent No.: US 10,348,106 B2
(45) Date of Patent: Jul. 9, 2019

(54) WIRELESS CHARGING DEVICE

(71) Applicant: Panasonic Intellectual Property Management Co., Ltd., Osaka (JP)

(72) Inventors: Yuto Yamanishi, Kanagawa (JP); Yoshio Yuse, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 62 days.

(21) Appl. No.: 15/742,979

(22) PCT Filed: Jul. 28, 2016

(86) PCT No.: PCT/JP2016/003497
§ 371 (c)(1),
(2) Date: Jan. 9, 2018

(87) PCT Pub. No.: WO2017/017959
PCT Pub. Date: Feb. 2, 2017

(65) Prior Publication Data
US 2018/0226815 A1 Aug. 9, 2018

(30) Foreign Application Priority Data
Jul. 29, 2015 (JP) ................. 2015-149108

(51) Int. Cl.
*H02J 7/00* (2006.01)
*H02J 7/02* (2016.01)
(Continued)

(52) U.S. Cl.
CPC .......... *H02J 7/0027* (2013.01); *H02J 7/0047* (2013.01); *H02J 7/025* (2013.01); *H02J 50/10* (2016.02); *H02J 50/40* (2016.02); *H02J 50/90* (2016.02)

(58) Field of Classification Search
CPC ........ H02J 7/0027; H02J 7/025; H02J 7/0047; H02J 50/90; H02J 50/10; H02J 50/40
(Continued)

(56) References Cited

U.S. PATENT DOCUMENTS 9,647,603 B2 * 5/2017 Koseki ................ B62D 5/0484
9,787,240 B2 * 10/2017 Koseki ................ B62D 5/0484
(Continued)

FOREIGN PATENT DOCUMENTS

JP  2012-523814  10/2012

OTHER PUBLICATIONS

International Search Report of PCT application No. PCT/JP2016/003497 dated Oct. 18, 2016.

*Primary Examiner* — M Baye Diao
(74) *Attorney, Agent, or Firm* — Greenblum & Bernstein, P.L.C.

(57) ABSTRACT

A wireless charging device includes a plurality of charging coils, a plurality of position detection coils corresponding respectively to the charging coils, and a voltage monitoring circuit for measuring a coil-end voltage of each of the position detection coils. A comparison is performed between a coil-end voltage of a first position detection coil corresponding to a charging coil used for charging and a coil-end voltage of a position detection coil adjacent to the first position detection coil, and, depending on a result of the comparison, a charging coil to be used for charging is switched to an adjacent charging coil.

7 Claims, 8 Drawing Sheets

(51) Int. Cl.
*H02J 50/10* (2016.01)
*H02J 50/40* (2016.01)
*H02J 50/90* (2016.01)

(58) Field of Classification Search
USPC ................................................ 320/108, 107
See application file for complete search history.

(56) References Cited

U.S. PATENT DOCUMENTS

| | | | |
|---|---|---|---|
| 10,090,718 B2 * | 10/2018 | Yamanishi | H02J 17/00 |
| 10,103,565 B2 * | 10/2018 | Yamanishi | H01F 38/14 |
| 2010/0259217 A1 | 10/2010 | Baarman et al. | |
| 2011/0109264 A1 * | 5/2011 | Choi | H01F 38/14 |
| | | | 320/108 |
| 2017/0194809 A1 * | 7/2017 | Partovi | H01F 5/003 |

* cited by examiner

To voltage monitoring circuit

WIRELESS CHARGING DEVICE

This application is a U.S. national stage application of the PCT International Application No. PCT/JP2016/003497 filed on Jul. 28, 2016, which claims the benefit of foreign priority of Japanese patent application No. 2015-149108 filed on Jul. 29, 2015, the contents all of which are incorporated herein by reference.

TECHNICAL FIELD

The present disclosure relates to a wireless charging device for charging a portable terminal.

BACKGROUND ART

Functions of a portable terminal such as a smartphone and a tablet PC (personal computer) have been extremely advanced, which leads to large power consumption.

Therefore, it is demanded that charging can be performed everywhere including an inside of a vehicle. As a trend in recent years, a portable terminal charging device capable of performing so-called wireless charging without using a cable has attracted attention. According to the wireless charging device, when a portable terminal is placed on a placement portion of an object to be charged, the portable terminal can be charged with magnetic flux from a charging coil.

PTL 1 discloses an example of such a wireless charging device. The charging device disclosed in PTL 1 employs a coil array system. In the system, among a plurality of charging coils constituting a coil array, only a part of charging coils corresponding to a position on which a portable terminal is placed (exactly, a position of a power receiving coil incorporated in the portable terminal) is used for charging.

CITATION LIST

Patent Literature

PTL 1: Japanese Translation of PCT International Publication No. 2012-523814

SUMMARY OF THE INVENTION

The charging device disclosed in PTL 1 performs an operation called ping in order to specify a position of the portable terminal. In the ping operation, energy is sequentially supplied to a plurality of charging coils so as to generate magnetic flux, and a reaction of a power receiving coil with respect to the magnetic flux is sensed. Thereby, a position of the portable terminal is specified. Therefore, when a positional displacement of the portable terminal occurs, it is necessary to stop charging once and then perform the ping operation again, for detecting a position of the portable terminal again.

When a charging device is disposed in a place that is subjected to much vibration, for example, inside a car, a position of a portable terminal may be frequently displaced. When the charging device disclosed in PTL 1 is disposed in such a place, stopping of charging and the ping operation are repeated frequently. Then, a period of time during which charging is stopped is increased. As a result, sufficient charging may not be performed.

Thus, a wireless charging device of the present disclosure includes a coil array including a plurality of charging coils, a plurality of position detection coils corresponding respectively to the plurality of charging coils, and a voltage monitoring circuit for measuring a coil-end voltage of each of the position detection coils. Then, a comparison is performed between a coil-end voltage of a first position detection coil corresponding to a first charging coil currently used for charging, and a coil-end voltage of a second position detection coil adjacent to the first position detection coil. Then, depending on a result of the comparison, a charging coil to be used for charging is switched from the first charging coil to the second adjacent charging coil adjacent to the first charging coil.

With such a configuration, even when a position of an object to be charged is displaced due to vibration or the like, a coil to be used for charging is switched quickly, thus preventing frequent interruption of charging.

According to the wireless charging device of the present disclosure, even when a position of an object to be charged is displaced due to vibration or the like, frequent interruption of charging can be prevented.

DESCRIPTION OF EMBODIMENTS

Hereinafter, an example of a wireless charging device in accordance with an exemplary embodiment of the present disclosure and an example in which the wireless charging device is installed in a vehicle are described with reference to the accompanying drawings.

Figure 1:
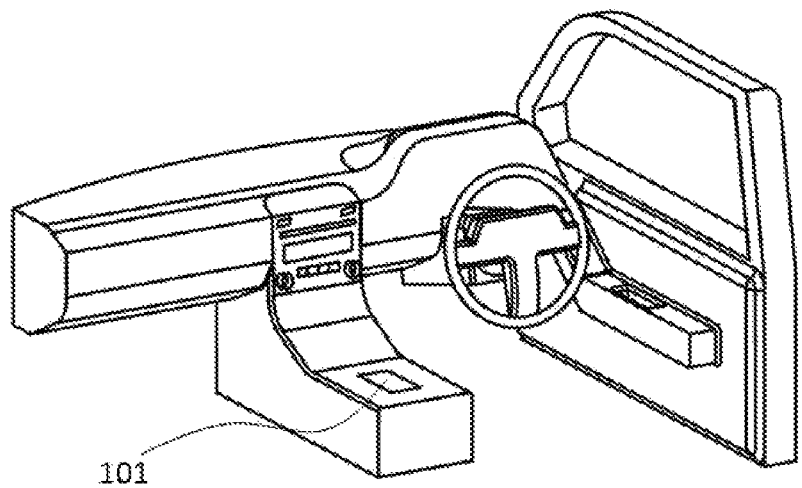
FIG. 1 is a view showing a state in which a wireless charging device in accordance with an exemplary embodiment is disposed in a vehicle interior.

FIG. 1 is a view showing a state in which wireless charging device 101 in accordance with the exemplary embodiment is disposed in an interior of a vehicle. FIG. 1 shows an example in which wireless charging device 101 is placed in a center console portion of the vehicle.

Figure 2:
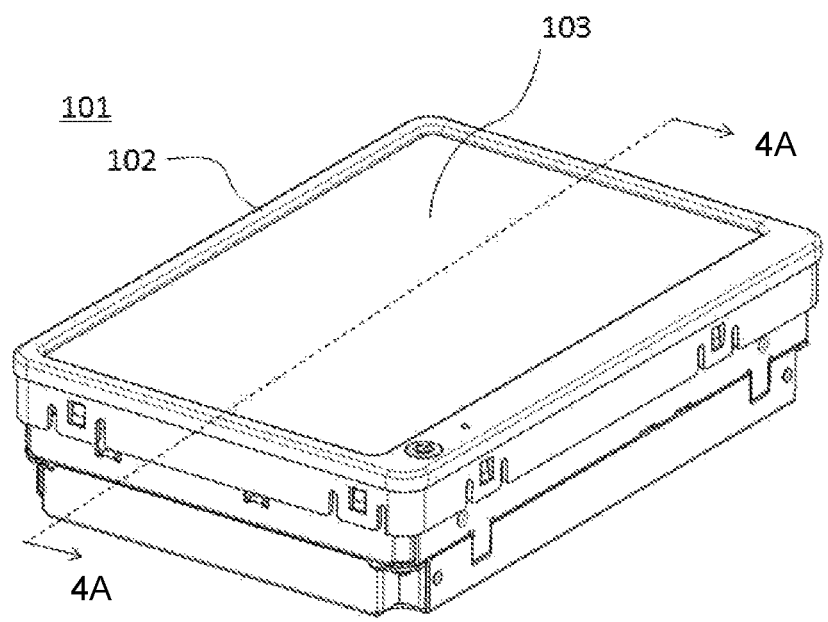
FIG. 2 is a perspective view showing an appearance of the wireless charging device in accordance with the exemplary embodiment.

FIG. 2 shows a state in which wireless charging device 101 is taken out from the vehicle. Wireless charging device 101 includes main body case 102. The upper surface of main body case 102 is placement portion 103 of an object to be charged on which a portable terminal as the object to be charged is placed.

Figure 3:
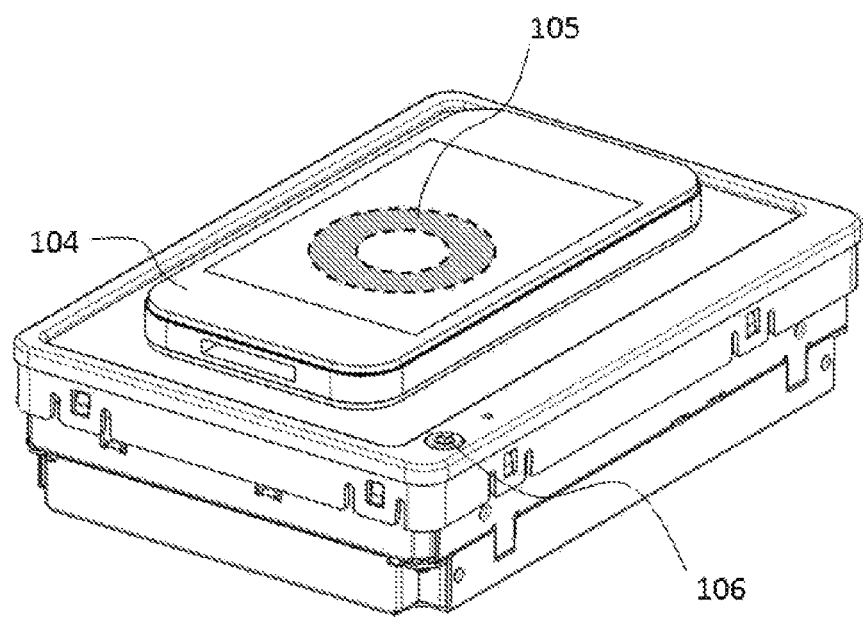
FIG. 3 is a view showing a state in which a portable terminal is placed on the wireless charging device in accordance with the exemplary embodiment.

FIG. 3 is a view showing a state in which portable terminal 104 is placed on wireless charging device 101 in accordance with the exemplary embodiment. Portable terminal 104 has power receiving coil 105 therein.

When a user presses charging start button 106 of wireless charging device 101, a charging coil incorporated in the main body case is supplied with energy. Then, an electromotive force is generated in power receiving coil 105 by magnetic flux generated from the charging coil, and a battery (not shown) incorporated in portable terminal 104 is charged by the electromotive force.

Next, the inside of main body case 102 is described in detail.

Figure 4A:
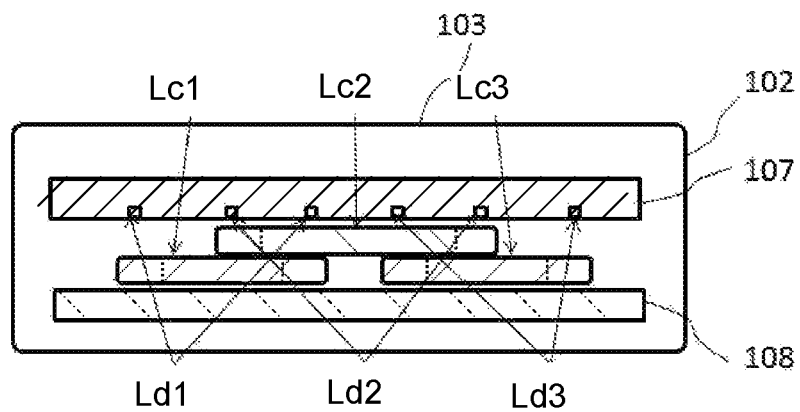
FIG. 4A is a view showing a section of the wireless charging device in accordance with the exemplary embodiment.

FIG. 4A is a sectional view of main body case 102 taken along line 4A-4A shown in FIG. 2. A plurality of charging coils Lc1, Lc2, and Lc3 is disposed inside main body case 102. The plurality of charging coils Lc1, Lc2, and Lc3 forms a coil array arranged so as to cover a chargeable region of the wireless charging device. Detection board 107 is disposed at a side provided with placement portion 103 with respect to the charging coil. On detection board 107, a plurality of position detection coils Ld1, Ld2, and Ld3 is mounted. Control board 108 is mounted at an opposite side to placement portion 103 with respect to the charging coil, that is, at a bottom surface side of the main body case. On control board 108, a charging circuit, a voltage monitoring circuit, and the like described below, are mounted.

Figure 4B:
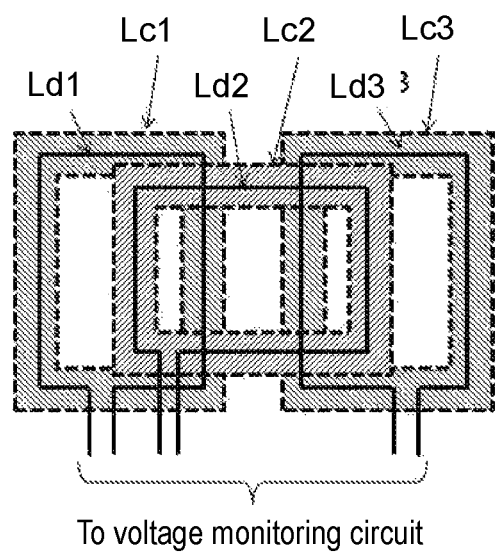
FIG. 4B is a plan view showing charging coils and position detection coils of the wireless charging device in accordance with the exemplary embodiment.

FIG. 4B is a plan view showing the charging coils and the position detection coils in accordance with the exemplary embodiment. For easy understanding, main body case 102 and the above-mentioned boards are not illustrated.

Each of charging coils Lc1, Lc2, and Lc3 has a ring shape around which a thin metal wire is wound, and has a rectangular outer shape. Charging coils Lc1, Lc2, and Lc3 are arranged such that they overlap each other. Furthermore, unlike other charging coils Lc1 and Lc3, charging coil Lc2 is arranged such that it is rotated by 90 degrees. This is because the chargeable region of the wireless charging device is made larger in the lateral direction.

Figure 8:
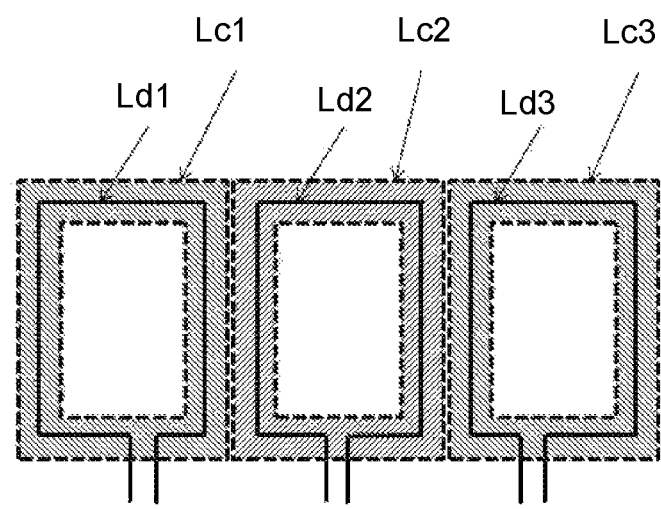
FIG. 8 is a plan view showing charging coils and position detection coils of a modified example.

Note here that it is not necessary to arrange charging coils Lc1, Lc2, and Lc3 such that they overlap each other. As shown in a modified example in FIG. 8, charging coils Lc1, Lc2, and Lc3 may be arranged side by side without overlapping.

Position detection coils Ld1, Ld2, and Ld3 are coils for sensing a direction in which portable terminal 104 moves during charging. Position detection coils Ld1, Ld2, and Ld3 have a ring shape, and correspond to charging coils Lc1, Lc2, and Lc3, respectively. The position detection coils are disposed immediately above the corresponding charging coils, respectively, and are formed substantially concentrically with the corresponding charging coils, respectively.

Next, a circuit including the charging coils and the position detection coils is described with reference to FIG. 5.

Figure 5:
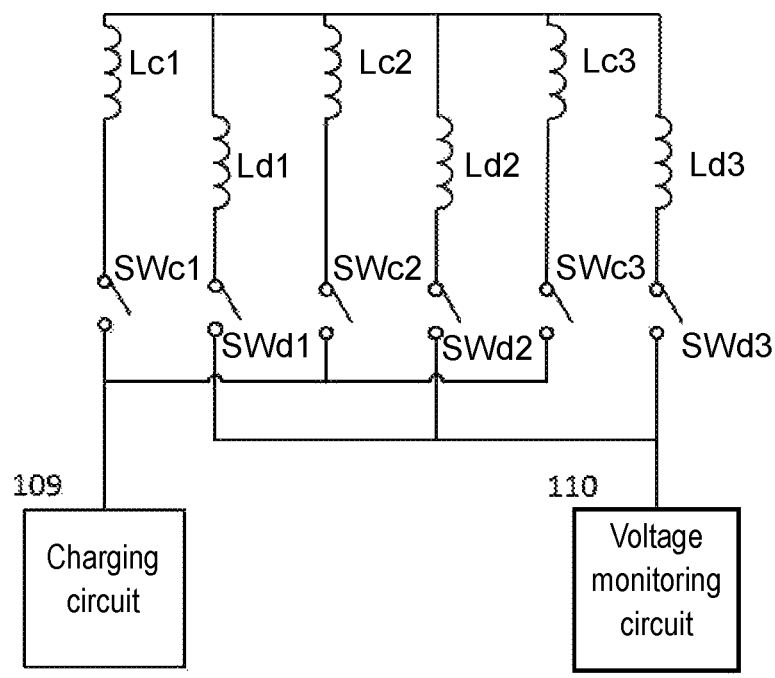
FIG. 5 is a circuit diagram of the wireless charging device in accordance with the exemplary embodiment.

As shown in FIG. 5, charging coils Lc1, Lc2, and Lc3 are connected to charging circuit 109 mounted on control board 108. Position detection coils Ld1, Ld2, and Ld3 are connected to voltage monitoring circuit 110 mounted on control board 108. Charging circuit 109 is a circuit for supplying energy to each charging coil. Voltage monitoring circuit 110 is a circuit for monitoring a voltage generated across each of the position detection coils. Furthermore, switches SWc1 to SWc3 and SWd1 to SWd3 are mounted on control board 108, for switching the connection of the charging coils and the position detection coils. In addition, a control circuit (not shown) for controlling charging circuit 109, voltage monitoring circuit 110, and the switches is also mounted on control board 108.

The circuit diagram of FIG. 5 is simplified. FIG. 5 shows that when any one of switches SWc1 to SWc3 is turned on, energy is supplied to any one of charging coils Lc1 to Lc3 connected to the switch that is turned on. FIG. also shows that when any one of switches SWd1 to SWd3 is turned on, a coil-end voltage generated across any one of position detection coils Ld1 to Ld3 connected to the switch that is turned on is measured.

Figure 6:
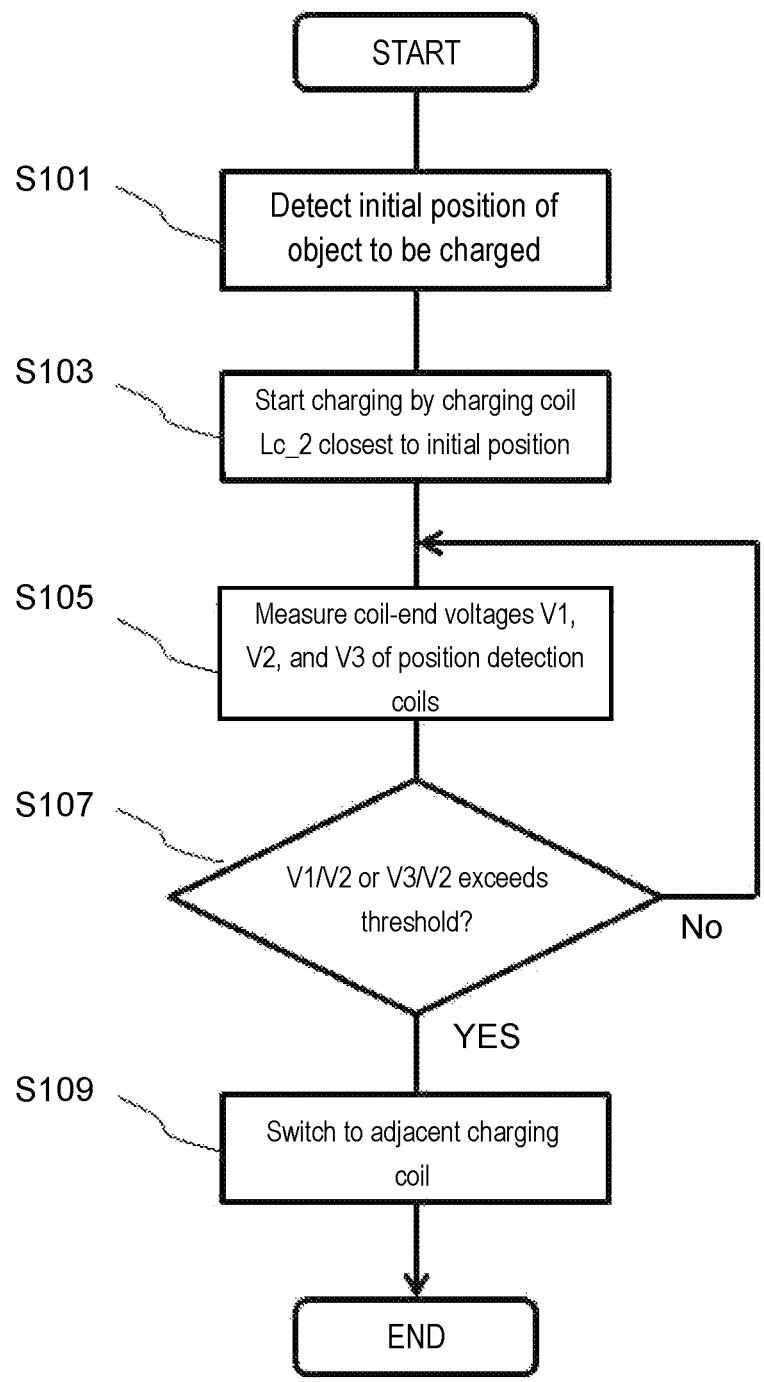
FIG. 6 is an operation flowchart of the wireless charging device in accordance with the exemplary embodiment.

Next, an operation of the wireless charging device in accordance with the exemplary embodiment is described with reference to FIG. 6, FIGS. 7A and 7B.

Firstly, when a user presses charging start button 106 of wireless charging device 101, before charging starts, an initial position of portable terminal 104 (exactly, a position of incorporated power receiving coil 105) is sensed (S101). A sensing method at this time may be a ping operation as in a conventional example, or a coil may be additionally provided for exclusive use for sensing a position of a portable terminal in a period during which charging is stopped. Such a coil can be provided on detection board 107.

Next, energy is supplied to a first charging coil that is the closest to a sensed position of portable terminal 104, and charging is started (S103). Herein, charging coil Lc2 is the first charging coil to be used for charging.

In a charging period, voltage monitoring circuit 110 monitors a coil-end voltage of a first position detection coil corresponding to the first charging coil used for charging and a coil-end voltage of a second position detection coil adjacent to the first position detection coil. Voltage monitoring circuit 110 monitors the coil-end voltage of each of position detection coils Ld1, Ld2, and Ld3, and outputs a signal indicating a value of each of the coil-end voltages V1, V2 and V3 to control unit (S105).

A coil-end voltage monitored by voltage monitoring circuit 110 is changed depending on which charging coil is used. For example, when charging coil Lc1 is used for charging, the coil-end voltage of position detection coil Ld1 corresponding to charging coil Lc1 and the coil-end voltage of position detection coil Ld2 adjacent to position detection coil Ld1 are monitored. When charging coil Lc3 is used for charging, the coil-end voltage of position detection coil Ld3 corresponding to charging coil Lc3, and the coil-end voltage of position detection coil Ld2 adjacent to position detection coil Ld3 are monitored. Furthermore, as in the exemplary embodiment, when charging coil Lc2 is used for charging, the coil-end voltage of position detection coil Ld2 corresponding to charging coil Lc2 and the coil-end voltages of position detection coils Ld1 and Ld3 at both adjacent sides of position detection coil Ld2 are monitored.

The number of the charging coils in accordance with the exemplary embodiment is three. However, also when the number of coils is increased, the position detection coil corresponding to the charging coil in use and the adjacent position detection coils are appropriately selected.

Next, the control unit compares the coil-end voltages measured by voltage monitoring circuit 110, and estimates a moving direction of power receiving coil 105. This exemplary embodiment shows an example of a method for estimating the moving direction.

The control unit calculates V3/V2 and V1/V2 based on the coil-end voltages input from voltage monitoring circuit 110. That is to say, the control unit calculates a ratio of the coil-end voltage of the first position detection coil corresponding to a first charging coil used for charging with respect to the coil-end voltage of a second position detection coil adjacent to the first position detection coil. Then, the control unit determines whether or not the value of V1/V2 or V3/V2 exceeds a threshold (S107).

When the control unit senses that the value of V1/V2 exceeds the threshold (YES in S107), the control unit switches a charging coil to be used for charging to the adjacent charging coil Lc3 from the first charging coil Lc2 (S109). In this way, when the position of power receiving coil 105 moves, switching to a more appropriate charging coil is carried out instantly. Note here that when neither V1/V2 nor V3/V2 exceeds the threshold (No in S107), the coil-end voltages V1, V2, and V3 are measured again.

Note here that in S107, the value of V3/V2 exceeds the threshold (YES in S107), the charging coil to be used for charging is switched to the adjacent charging coil Lc1.

As mentioned above, wireless charging device 101 in accordance with the exemplary embodiment performs comparison between the coil-end voltage of the first position detection coil corresponding to the charging coil used for charging and the coil-end voltage of the position detection coil adjacent to the first position detection coil. From a result of the comparison, the moving direction of power receiving coil 105 is estimated. Then, the charging coil to be used for charging is switched to an adjacent charging coil that is in the moving direction of power receiving coil 105.

Note here that in the switching of the charging coil in S109, the charging coil is switched to the adjacent charging coil not at one time, but charging may be performed in two steps. That is, charging by the first charging coil and charging by the adjacent charging coil are performed simultaneously, and then switching to the adjacent charging coil is performed completely. This is carried out for the purpose of preventing a large voltage from being applied to a switch when coils are switched at one time.

Then, relation between the moving direction of power receiving coil 105 and a change of value of the coil-end voltage is described.

Figure 7A:
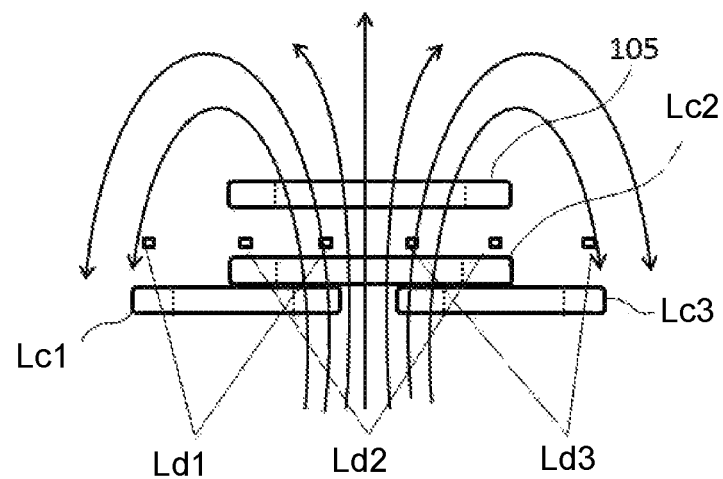
FIG. 7A is a diagram showing magnetic flux distribution during charging when a power receiving coil is provided immediately above the charging coil.
Figure 7B:
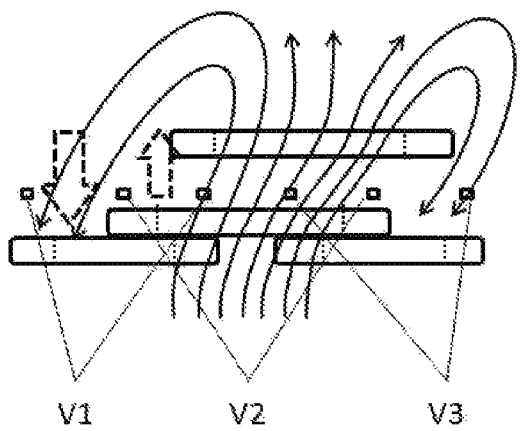
FIG. 7B is a diagram showing magnetic flux distribution during charging when the power receiving coil is slightly displaced from immediately above the charging coil.

FIGS. 7A and 7B are diagrams showing magnetic flux distribution around the charging coils when charging coil Lc2 is used for charging. FIG. 7A shows a state in which power receiving coil 105 is immediately above charging coil Lc2. Solid-line arrows in the drawing show magnetic flux directions, and show a state in which the magnetic flux passing through the inside of charging coil Lc2 passes through the inside of power receiving coil 105, and returns to charging coil Lc2 again.

Herein, a case where power receiving coil 105 is slightly displaced from the initial position due to vibration or the like during charging is considered. FIG. 7B shows a case where power receiving coil 105 is displaced from the position immediately above charging coil Lc2 to right. At this time, the coil-end voltage V1 of position detection coil Ld1 positioned at the opposite side to the moving direction of power receiving coil 105 is increased.

Solid line arrows in FIG. 7B show the magnetic flux distribution when power receiving coil 105 is displaced. When attention is paid to magnetic flux passing through the inside of position detection coil Ld1, magnetic flux extending upward is attracted to a power receiving coil 105 side, and thereby balance between a magnetic flux extending upward and a magnetic flux extending downward is changed as shown in dotted-line arrows. By each of the magnetic flux extending upward and the magnetic flux extending downward, electromotive forces generated in position detection coil Ld1 are cancelled by each other. Accordingly, when the direction of the magnetic flux is biased to any one side, the electromotive force is increased. It is considered that with change of the magnetic flux distribution from FIG. 7A to FIG. 7B, the rate of the magnetic flux extending downward in the magnetic flux passing through the inside of position detection coil Ld1 is increased, resulting in increasing the coil-end voltage V1.

For the above-mentioned reasons, the charging coil to be used for charging is switched to a charging coil positioned in the direction opposite to the direction of the position detection coil in which increase in coil-end voltage V1 is sensed.

Note here that this exemplary embodiment describes switching from charging coil Lc2 positioned in the center (which means other charging coils exist on both adjacent ends) of a coil array including a plurality of charging coils to adjacent other charging coil Lc1 or Lc3.

On the other hand, when the initial position of power receiving coil 105 is an end of the chargeable region, a first charging coil to be firstly used for charging is charging coil Lc1 or Lc3 positioned at an end of the coil array. Therefore, the charging coil to be used for charging is switched from the charging coil positioned at the end to charging coil Lc2 positioned at the center. At this time, it is preferable that a threshold when the coil-end voltages are compared is made to be different from that in the case of switching from the center charging coil Lc2. This is because magnetic flux distribution during charging is different between a case where the charging coil to be used for charging is at the end of the coil array and a case where the charging coil to be used for charging is at the center, so that a change amount of the coil-end voltage of the position detection coil, which is generated when a position of the power receiving coil is displaced, is different.

Therefore, it is preferable that a threshold in the comparing of the coil-end voltages is made to be different between a case of switching from a charging coil positioned at an end of the coil array to an adjacent charging coil and a case of switching from a position charging coil positioned at the center of the coil array to an adjacent charging coil.

That is to say, it is preferable that a threshold in the comparison mentioned above is made to be different depending on the positions of the first charging coil in the coil array.

As mentioned above, according to the wireless charging device in accordance with the exemplary embodiment, the coil-end voltages of the position detection coils are compared, and the charging coil to be used for charging is switched to an adjacent charging coil depending on the comparison result. Therefore, even when a positional displacement of an object to be charged occurs, switching of charging coils can be carried out instantly. Consequently, it is not necessary to stop and detect positions again every time when positional displacement of an object to be charged occurs.

INDUSTRIAL APPLICABILITY

It is possible to provide a wireless charging device capable of preventing frequent interruption of charging even when a position of an object to be charged is displaced due to vibration or the like.

REFERENCE MARKS IN THE DRAWINGS 101 wireless charging device
102 main body case 103 placement portion of an object to be charged
104 portable terminal
105 power receiving coil
106 charging start button
107 detection board
108 control board
109 charging circuit
110 voltage monitoring circuit
Lc1, Lc2, Lc3 charging coil
Ld1, Ld2, Ld3 position detection coil

The invention claimed is:

1. A wireless charging device for wirelessly transmitting charging power to an object to be charged, the wireless charging device comprising:
   a coil array including a plurality of charging coils;
   a plurality of position detection coils corresponding respectively to the plurality of charging coils; and
   a voltage monitoring circuit configured to measure a coil-end voltage of each of the position detection coils,
   wherein a comparison is performed between a coil-end voltage of a first position detection coil, of the plurality of position detection coils, corresponding to a first charging coil currently used for charging, and a coil-end voltage of a second position detection coil, of the plurality of position detection coils, adjacent to the first position detection coil, and,
   depending on a result of the comparison, a charging coil, among the plurality of charging coils, to be used for charging is switched from the first charging coil to a second charging coil adjacent to the first charging coil.

2. The wireless charging device according to claim 1, wherein the comparison is performed by calculating a ratio of the coil-end voltage of the first position detection coil to the coil-end voltage of the second position detection coil.

3. The wireless charging device according to claim 1, wherein the plurality of position detection coils is disposed concentrically with the plurality of corresponding charging coils, respectively.

4. The wireless charging device according to claim 1, wherein a charging coil to be used for charging is switched to a charging coil positioned in a direction opposite to a direction of a position detection coil whose coil-end voltage is increased, seen from the first charging coil.

5. The wireless charging device according to claim 1, wherein a threshold in the comparison is different depending on a position of the first charging coil in the coil array including the plurality of charging coils.

6. The wireless charging device according to claim 5, wherein the threshold in the comparison is different between a case where the first charging coil is positioned at an end of the coil array including the plurality of charging coils and a case where the first charging coil is positioned at a center of the coil array.

7. The wireless charging device according to claim 1, wherein while the charging coil to be used for charging is switched from the first charging coil to the second charging coil, charging by the first charging coil and charging by the second charging coil are performed simultaneously.

* * * * *